(12) United States Patent
Barrell

(10) Patent No.: US 12,386,707 B1
(45) Date of Patent: Aug. 12, 2025

(54) ANTI-FRAGILE STORAGE SYSTEMS

(71) Applicant: VDURA, Inc., San Jose, CA (US)

(72) Inventor: Michael Barrell, Longmont, CO (US)

(73) Assignee: VDURA, Inc., San Jose, CA (US)

( * ) Notice: Subject to any disclaimer, the term of this patent is extended or adjusted under 35 U.S.C. 154(b) by 0 days.

(21) Appl. No.: 19/048,535

(22) Filed: Feb. 7, 2025

(51) Int. Cl.
*G06F 11/10* (2006.01)

(52) U.S. Cl.
CPC ...... *G06F 11/1096* (2013.01); *G06F 11/1084* (2013.01)

(58) Field of Classification Search
CPC .................. G06F 11/1096; G06F 11/1084
See application file for complete search history.

(56) References Cited

U.S. PATENT DOCUMENTS

| | | | | |
|---|---|---|---|---|
| 2011/0047442 A1* | 2/2011 | Dave | ............. | G06F 11/1068 714/E11.034 |
| 2015/0363262 A1* | 12/2015 | Hu | ............. | H03M 13/3738 714/773 |
| 2021/0083693 A1* | 3/2021 | Danilov | ............. | H03M 13/154 |

* cited by examiner

*Primary Examiner* — Thien Nguyen
(74) *Attorney, Agent, or Firm* — Fenwick & West LLP

(57) ABSTRACT

A storage system receives an initial failure rate of a storage device based on manufacturer specifications and determining a first erasure coding configuration to meet minimum reliability metrics. Data is encoded in the storage device using the first configuration. Operational data is then collected to monitor failures, and a second failure rate is determined if deviations from the initial rate exceed a predetermined threshold. Based on the updated failure rate and reliability metrics, a second erasure coding configuration, different from the first erasure coding configuration, is determined. The system then re-encodes data using the second configuration.

20 Claims, 9 Drawing Sheets

ANTI-FRAGILE STORAGE SYSTEMS

BACKGROUND

1. Field of the Disclosure

The present disclosure relates to storage systems and more specifically to modifying storage system configuration based on failure rates of storage devices.

2. Description of the Related Art

In storage systems, data reliability include important metrics, which are often managed through techniques like replication or erasure coding. Replication simply makes copies of the entire dataset and stores them on different nodes. While simple, it is less storage efficient than erasure coding because it requires 100% duplication (or more) of data.

Erasure coding offers higher storage efficiency because it uses less redundancy than full replication, while still providing high reliability. It allows for data reconstruction with fewer stored copies, resulting in more usable storage capacity compared to replication. Erasure coding breaks data into chunks, stores them across multiple nodes, and generates redundant chunks for protection. For example, a file might be split into several data chunks. In addition to the data chunks, parity chunks are created. These parity chunks are additional pieces of data that can be used to reconstruct the original file if one or more data chunks are lost or corrupted. The number of parity chunks is configurable and typically depends on the required level of redundancy and reliability. Both the data chunks and the parity chunks are stored across multiple storage nodes in a distributed system. This distribution ensures that if some nodes fail or data becomes inaccessible, the system can still recover the complete data using the remaining chunks and the parity chunks.

For example, an "8+2" erasure coding scheme might break a file into 8 data chunks and create 2 parity chunks. These 10 total chunks are then distributed across 10 nodes. If 1 or even 2 nodes fail the system can use the remaining chunks (including the parity) to fully reconstruct the original data. The "8+2" scheme corresponds to a number of node failures the system can tolerate (in this case, up to 2 failures). The reliability of such systems is often measured in terms of availability (accessibility of data) and durability (ability to avoid data loss over time), typically expressed as a number of "nines" (e.g., 99.999% durable or available).

SUMMARY

Traditional storage systems are configured based on initial assumptions about component failure rates from manufactures, but these may not be accurate as real-world conditions cause components to fail at varying rates. This discrepancy can lead to systems being either over protected, which reduces efficiency, or under protected, which raises the risk of data loss. Embodiments described herein address these issues by continuously monitoring actual component failure rates and dynamically adjusting the system's configuration in response.

In some embodiments, a storage system, including a storage device, is associated with one or more minimum reliability metrics, such as a minimum availability rate and/or a minimum durability rate, which may be set by users or by the system automatically. The system receives a first failure rate of the storage device based on manufacturer specification, determines a first erasure coding configuration of the storage system based on the first failure rate and the one or more minimum reliability metrics of the storage system, and encodes data in the storage device based on the first erasure coding configuration. The system collects data associated with failures of the storage device, and determines a second failure rate that deviates from the first failure rate by a predetermined threshold based on the collected data. The system determines a second erasure coding configuration of the storage system, different from the first erasure coding configuration, based on the second failure rate and the one or more minimum reliability metrics; and re-encodes data in the storage device based on the second erasure coding configuration.

In some embodiments, the first erasure coding configuration of the storage system includes storing data in a first number of data chunks and a second number of parity chunks. The second erasure coding configuration of the storage system is determined by modifying the first number of data chunks or the second number of parity chunks. Alternatively, or in addition, the second erasure coding configuration of the storage system is determined by modifying a ratio of the first number of data chunks relative to the second number of parity chunks, thereby modifying storage overhead required for redundancy.

In some embodiments, the one or more minimum reliability metrics includes at least one of a minimum availability level or a minimum durability level. In some embodiments, the system further determines a first or second data availability mean time to not available (MTTNA) based on the respective first or second failure rate, and determines the first or second erasure coding configuration of the storage system based on the respective first or second MTTNA and the specified availability level. In some embodiments, the system further determines a first or second mean time to data loss (MTTDL) based on the respective first or second failure rate, and determines the first or second erasure coding configuration of the storage system based on the respective first or second MTTDL and the specified durability level.

In some embodiments, a machine learning model is trained using historical data associated with storage devices, corresponding erasure coding configurations, and reliability metrics. The machine learning model is configured to receive data associated with failures of the storage device and one or more minimum reliability metrics as input, and to output an erasure coding configuration that can provide the specified minimum reliability metrics using the storage device.

BRIEF DESCRIPTION OF THE DRAWINGS

The teachings of the embodiments can be readily understood by considering the following detailed description in conjunction with the accompanying drawings.

Figure 1:
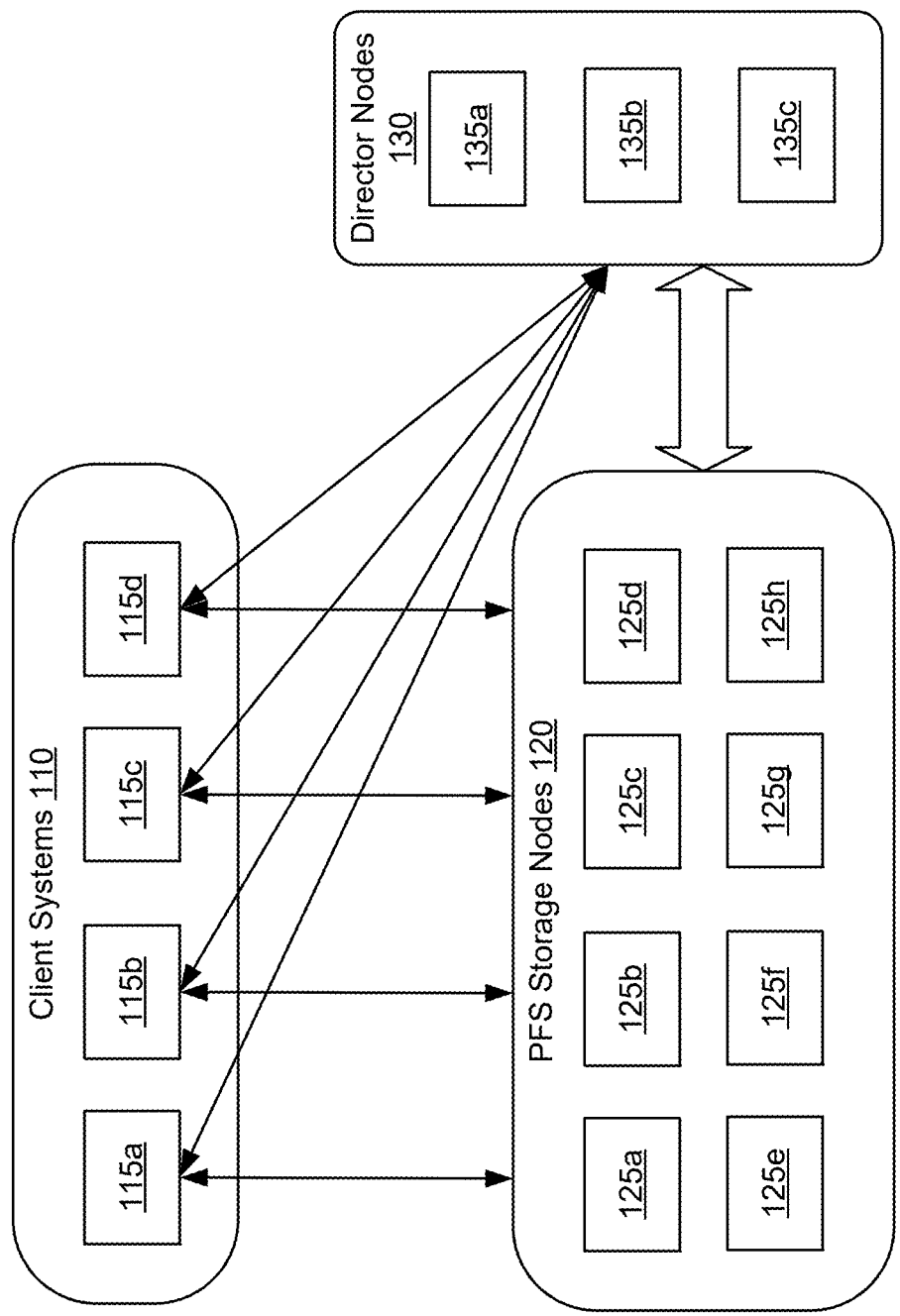
FIG. 1 illustrates the various components in the system environment of a storage system, in accordance with one or more embodiments.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

DETAILED DESCRIPTION

A storage system according to an embodiment uses multiple storage nodes and performs parallel and redundant access to data storage nodes to deliver high performance data access with scalability and reliability. For example, the storage system may implement erasure coding schemes to provide partial redundancy, ensuring desired reliability. In an erasure coding scheme, data is divided into multiple data chunks, and then additional parity chunks are generated from these data chunks. Parity chunks are extra pieces of information that are used to rebuild the lost data if a failure occurs (e.g., a node or disk failure). Unlike replication, which requires duplicating entire dataset, erasure coding creates a smaller amount of redundant data (parity chunks) relative to the original data, which makes it more storage-efficient. The storage system can recover lost or corrupted data chunks using remaining data chunks and parity chunks. For example, in an 8+2 erasure coding scheme, data is divided into 8 chunks, and 2 parity chunks are added. If up to 2 chunks are lost (e.g., due to a node failure), the storage system can still reconstruct the original data using the remaining chunks and parity chunks. In erasure coding schemes, both data chunks and parity chunks are distributed across multiple nodes in a network. this ensures that even if one or more nodes fail, the data can still be recovered from the other nodes.

Traditional storage systems are configured to maintain a specified level of reliability based on initial assumptions about component failure rates provided by manufacturers. However, these assumptions may not hold true as components can fail at rates higher or lower than those assumed. This mismatch between assumed and actual failure rates can leave systems either overprotected (leading to unnecessary costs) or underprotected (increasing the risk of data loss). For example, in reality, components like hard drives and SSDs from different manufacturing batches may exhibit varying reliability. Increased workloads or environmental factors can also accelerate wear and tear, further deviating from initial failure rate assumptions. Once a storage system is configured, it traditionally remains static, not adjusting to changes in the operational environment or component performance. This can lead to inefficiencies and vulnerabilities as the actual state of the system components drifts away from the initial assumptions.

Embodiments described herein address the above described problem by continuously monitoring actual component failure rates and adjusting configuration dynamically. This means a system can respond to changes in component performance, maintaining optimal reliability. By automatically adjusting the erasure coding based on actual failure data, the system ensures that the desired level of reliability is maintained consistently, despite variations in component performance or operational conditions. By aligning the system's redundancy levels with actual needs based on real failure data, the system can reduce overprovisioning of redundancy, leading to cost savings without compromising data integrity.

EXAMPLE STORAGE SYSTEM

FIG. 1 illustrates the various components in the system environment of a storage system, according to an embodiment. The system environment of the storage system includes a set 110 of client systems 115*a*, 115*b*, 115*c*, 115*d*, a set 120 or storage nodes 125*a*, 125*b*, 125*c*, 125*d*, 125*e*, 125*f*, 125*g*, 125*h* and a set 130 of director nodes 135*a*, 135*b*, 135*c*. The director nodes 135 and storage nodes 125 are computer systems that run the storage system. A client system 115 includes a client driver that is a loadable software module that interacts with the director nodes and storage nodes to read and write the files stored by the storage system. Any required administration is performed via a graphical user interface (GUI) or call level interface (CLI) running on a director node 135. All the director nodes and storage nodes work together to provide a single file system namespace referred to as a realm.

According to an embodiment, the storage system separates the control plane from the data plane. The director nodes 135 in the storage system form the control plane. The director nodes 135 perform various tasks including caching and modifying file system metadata (e.g., directories, file attributes, access permissions, etc.), coordinating the actions of the storage nodes 125 and the client drivers for file accesses, managing membership status of director and storage nodes within the storage system storage cluster, and controlling all failure recovery and data reliability operations. According to an embodiment, director nodes 135 are commodity compute servers with a high-speed networking connection, significant DRAM capacity, and a persistent store for transaction logs.

Storage nodes in the storage system form the data plane. Storage nodes represent the component of the overall architecture that stores data or metadata. While director nodes serve and modify file system metadata, they use storage nodes to store the metadata. The client driver is a loadable file system that is installed on compute servers and used by application programs running on a client system like any other file system. The client driver works with the director nodes and storage nodes to deliver a POSIX-compliant and cache-coherent file system behavior. Each file stored by the storage system is individually striped across many storage nodes, allowing each component piece of a file to be read and written in parallel, increasing the performance of accessing each file. For each file that the application wants to access, the client driver on the client system communicates over the network directly to all the storage nodes that hold that file's data.

The storage system scales out both director nodes 135 and storage nodes 125. For any given configuration of the system, additional director nodes can be added for more metadata processing performance. Similarly additional storage nodes can be added for more capacity or more storage performance.

Figure 2:
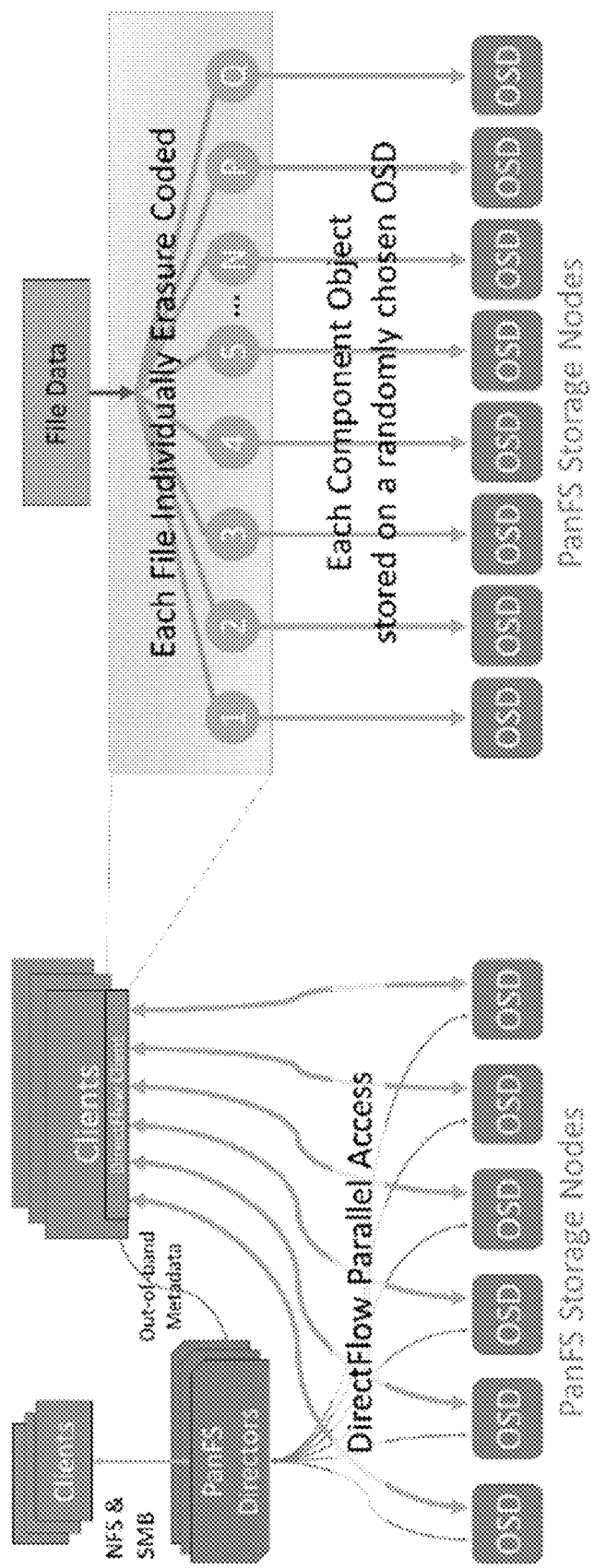
FIG. 2 illustrates how data is stored in a file in the storage system, in accordance with one or more embodiments.

FIG. 2 illustrates how data is stored in a file in the storage system, according to an embodiment. The storage system uses multiple storage nodes by assigning a map to each file. The map for a file shows where all the striped component parts of that file are located, and which storage node holds each part. The client driver uses the map to determine which storage nodes to access, directly or in parallel. storage system uses network erasure coding as part of that striping to ensure data integrity and reliability.

The client driver provides the semantics of a locally-mounted, POSIX-compliant file system. The storage system ensures that if a process P2 (possibly on another compute server) is writing to a file at the same time the process P1 is reading from the file, this process P1 will not read stale data. Accordingly, storage system provides cache coherency across all the nodes running the client driver.

storage system performs random assignment of component objects to storage nodes to spread the load from file accesses across all those nodes. Typically, the number of storage nodes is much larger than the typical stripe width of a file. As a result, each file is very likely to only share a few storage nodes with any other files. This reduces the odds of any one storage node becoming overloaded and impacting the performance of the whole realm. As a result, the storage system provides a consistent system performance.

Figure 3:
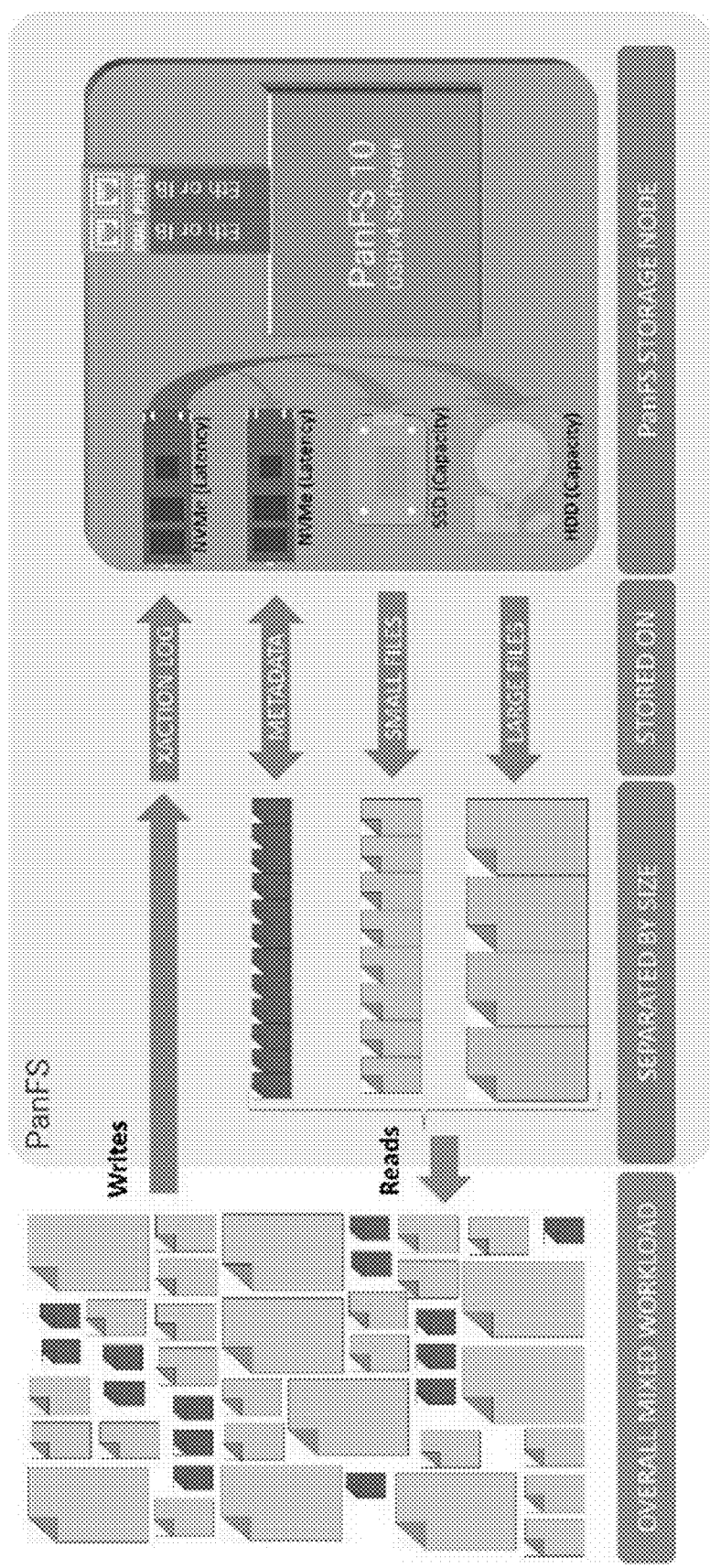
FIG. 3 illustrates the operation of storage nodes of the storage system, in accordance with one or more embodiments.

FIG. 3 illustrates the operation of storage nodes of the storage system, according to an embodiment. The storage system architecture provides performance and reliability advantages as well as significant performance optimizations using the storage node software to enable efficient use of the available storage media inside each storage node. The storage system storage node handles multiple performance tiers of storage. According to an embodiment, the different performance tiers of a storage node include storage class memory such as CXL (Compute Express Link's) persistent memory, latency optimized NVMe (non-volatile memory express) SSDs (solid state drives), capacity optimized SSDs, and HDDs (hard disk drives).

The storage node separates the storage of metadata from the storage of data. Metadata is usually composed of very small records that are accessed in unpredictable patterns and are typically latency sensitive. Directories are also metadata and are latency sensitive, that is often accessed sequentially. As a result of being small, typically having unpredictable access patterns, and being latency sensitive, the storage node stores metadata using a different storage mechanism than files storing user data, which are typically much larger and accessed sequentially. The storage node stores metadata in a database in one of the higher tiers of storage drives, typically an NVMe SSD, and stores bulk user file data in one of the lower tiers of drives, typically capacity-optimized SSDs or HDDs. The storage node uses the highest available tier of storage drives for storing a transaction log, committing the incoming data, metadata, or operations to stable storage, therefore allowing the application to continue its processing as quickly as possible.

The storage system takes advantage of the DRAM in each storage node as a low-latency cache of the most recently read or written data and metadata. The storage node stores small component objects in capacity-optimized SSDs that provide cost-effective and high-bandwidth storage. A POSIX file of less than a threshold size, for example, less than 1.5 MB size may be fully stored on SSDs. The storage system tries to keep each SSD full above a threshold level, for example, above 80% full. If an SSD falls below that threshold level, the storage system selects the smallest component objects from the next slowest set of drives and moves them to the SSD until it is about 80% full. If the SSD is too full, storage system moves the largest component objects on the SSD to the next slower tier of drives. Every storage node performs this optimization independently and continuously. A storage node selects component objects to move by looking in its local metadata database.

Storage nodes in the storage system are object storage devices (OSDs). An object stored in an OSD is a Small Computer System Interface (SCSI) object. The storage system can be configured to create a blade set (BladeSet) for different classes of storage nodes. For example, storage nodes with a capacity of 280 TB each should not be combined into the same blade set as storage nodes with a capacity of 132 TB each. This helps to evenly spread the workload across the pool of storage nodes and avoid hot-spots. According to an embodiment, the storage system supports multiple blade sets in a realm and in the same namespace at the same time.

Figure 4:
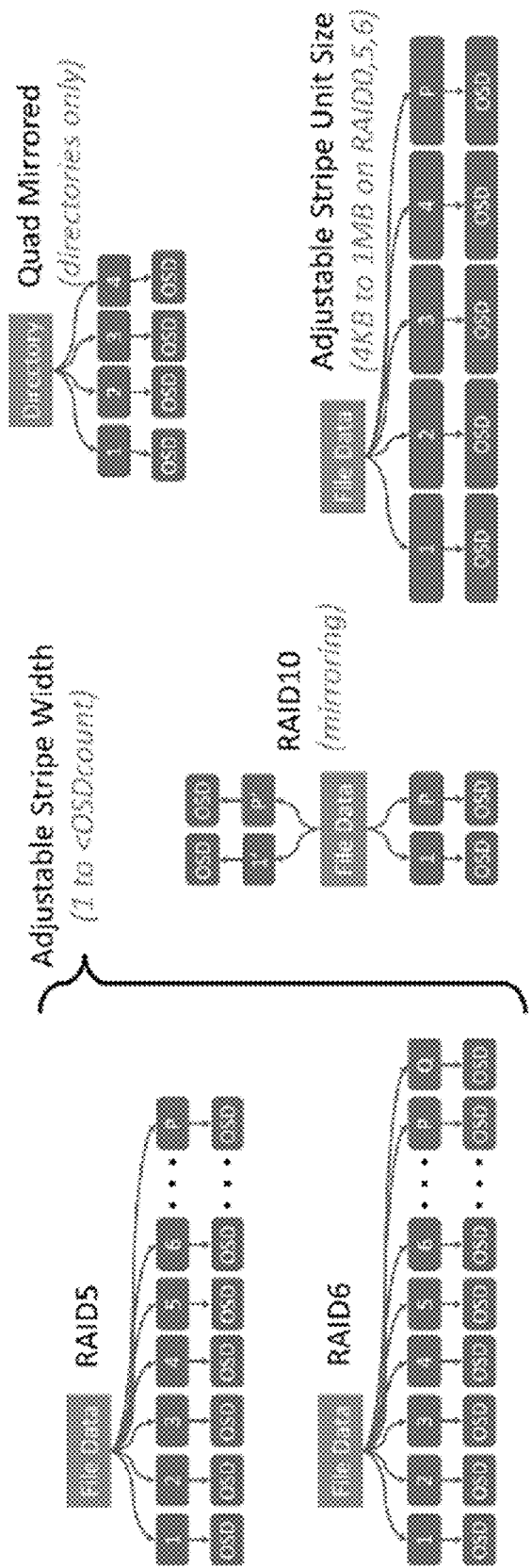
FIG. 4 shows the details of layout of a file stored in the storage system, in accordance with one or more embodiments.

FIG. 4 shows the details of layout of a file stored in the storage system, according to an embodiment. The storage system stripes a large POSIX file across a set of component objects and adds additional component objects into that stripe that store a plurality of data protection values, for example, the P and Q data protection values of an N+2 erasure coding scheme. P data represents parity data and Q data represents Q-parity data. The storage system stores large POSIX files using erasure coding across multiple component objects, and store small POSIX files using triple-replication across three component objects. This approach delivers higher performance and makes it more space efficient. Unless the first write to a file is a large one, the storage system starts as a small file. If a small file grows into a large file, the director node transparently transitions the file to the erasure coded format at the point that the erasure coded format becomes more efficient. When a file is created, and as it grows into a large file, the director node that is managing those operations randomly assigns each of the individual component objects that make up that file to different storage nodes. No two component objects for any file are assigned to the same failure domain.

If a storage system storage node fails, the storage system reconstructs only those component objects that were on the failed storage node. This is distinct from a RAID array that would reconstruct the entire raw capacity of the storage node. The storage system reads the component objects for each affected file from all the other storage nodes and uses each file's erasure code to reconstruct the component objects that were on the failed node.

When a BladeSet in the storage system is first set up, the storage system sets aside a configurable amount of spare space on all the storage nodes in that BladeSet to hold the output from file reconstructions. When the storage system reconstructs a missing component object, it writes it to the spare space on a randomly chosen storage node in the same BladeSet. As a result, during a reconstruction the storage system uses the combined write bandwidth of all the storage nodes in that BladeSet. The increased reconstruction bandwidth reduces the total time to reconstruct the affected files, which reduces the odds of an additional failure during that time, thereby increasing the overall reliability.

The N+2 erasure coding implemented by the storage system protects against two simultaneous failures within any given BladeSet without any data loss. More than two failures in a realm are automatically and transparently recovered from, as long as there are no more than two failed storage nodes at any one time in a BladeSet.

If a third storage node were to fail in a BladeSet while two others were being reconstructed, that BladeSet would immediately transition to read-only state, as a result. Only the files in the BladeSet that had component objects on all three of the failed storage nodes would have lost data, which becomes a smaller and smaller percentage as the size of the BladeSet increases. All other files in the BladeSet are unaffected or recoverable using their erasure coding.

Since the storage system maintains a complete directory tree, it can identify the full pathnames of precisely which files need to be restored from a backup or reacquired from their original source, and can therefore also recognize which files were either unaffected or recovered using their erasure coding.

STORAGE RELIABILITY

A user may be allowed to configure reliability at an initial setup or configuration phase of the storage system. This occurs before the system begins processing data, as it allows the user to specify the desired reliability target based on the specific needs of their applications.

Generally, reliability includes durability and availability. Durability refers to the storage system's ability to avoid data loss over time. Availability refers to the ability of the system to remain online and accessible. Durability and availability are often expressed as percentage or "nines," where more nines represent better reliability.

Table 1 below shows statistics for storage systems based on the number of "nines" in their durability rating. The more nines, the less likely data loss is. For a system with 90% durability (1 nine), 1 out of every 10 systems is expected to experience data loss. For a system with 99% durability (2 nines), 1 out of every 100 systems is expected to have data loss. For 99.999% durability (5 nines), only 1 out of every 100,000 systems may experience data loss.

TABLE 1

| Nines | Percentage | How to think about it |
| --- | --- | --- |
| 1 | 90% | For 10 systems 1 has data loss |
| 2 | 99% | For 100 systems 1 has data loss |
| 3 | 99.9% | For 1000 systems 1 has data loss |
| 4 | 99.99% | For 10000 systems 1 has data loss |
| 5 | 99.999% | For 100000 systems 1 has data loss |

Table 2 below shows statistics for storage systems based on the number of "nines" in their availability rating. For example, "1 nine" represents 90% uptime, "2 nines" represent 99% uptime, and so on. Each additional nine represents a higher degree of system availability. The total number of minutes the system is online (available) in a year may be calculated based on the availability percentage. There are 525,600 minutes in a year (60 minutes×24 hours×365 days). A system with 90% availability is online for 473,040 minutes per year, and such a system will be down for 52,560 minutes (36.5 days) per year. A system with 99.999% availability is online for 525,594 minutes per year, and such a system will be down for only 5 minutes per year.

TABLE 2

| Nines | Percentage | Minutes online per year | Minutes Down per year |
| --- | --- | --- | --- |
| 1 | 90% | 473040 | 52560 (36.5 days) |
| 2 | 99% | 520344 | 5256 |
| 3 | 99.9% | 525074 | 525 |
| 4 | 99.99% | 525547 | 52 |
| 5 | 99.999% | 525594 | 5 |

As the number of nines (availability percentage) increases, the system's downtime decreases significantly. For example, moving from 3 nines (99.9%) to 5 nines (99.999%) reduces downtime from 525 minutes (about 9 hours per year) to just 5 minutes per year. As shown in Table 1, a small increase in the number of nines results in a significant reduction in system downtime, especially at higher levels of availability.

Different types of applications often have their targeted availabilities and durabilities. For example, systems like in-house testing environments or development servers might tolerate significant downtime (e.g., 90% availability), as their availability is less critical to the business. If these systems are down, it does not impact external users or production systems. Such systems may also tolerate occasional data loss since the data is often temporary or easy to recreate. Losing 1 out of 10 system in these environments may not have a significant business impact.

As another example, social media platforms may require a higher availability (e.g., 99.9% or 99.99% availability) due to the business nature of transactions and the need for 24/7 service. Such systems may also tolerate some level of data loss, as losing occasional user posts or non-critical content would not drastically impact overall platform functionality.

On the other hand, stock exchanges or real-time trading systems may require extremely high availability (e.g., 99.999% or even higher availability) to ensure transactions can be executed without delays, as downtime could lead to massive financial losses. Such systems may also require high durability to ensure that no transaction data is lost, as this could lead to significant financial losses.

In a storage system that stores data with partial redundancy, reliability may be determined based in part on data storing schemes, and a number of nodes in the storage system. Additional details on how durability and availability are determined are discussed further below with respect to FIGS. 5-7.

DETERMINING DURABILITY

Figure 5:
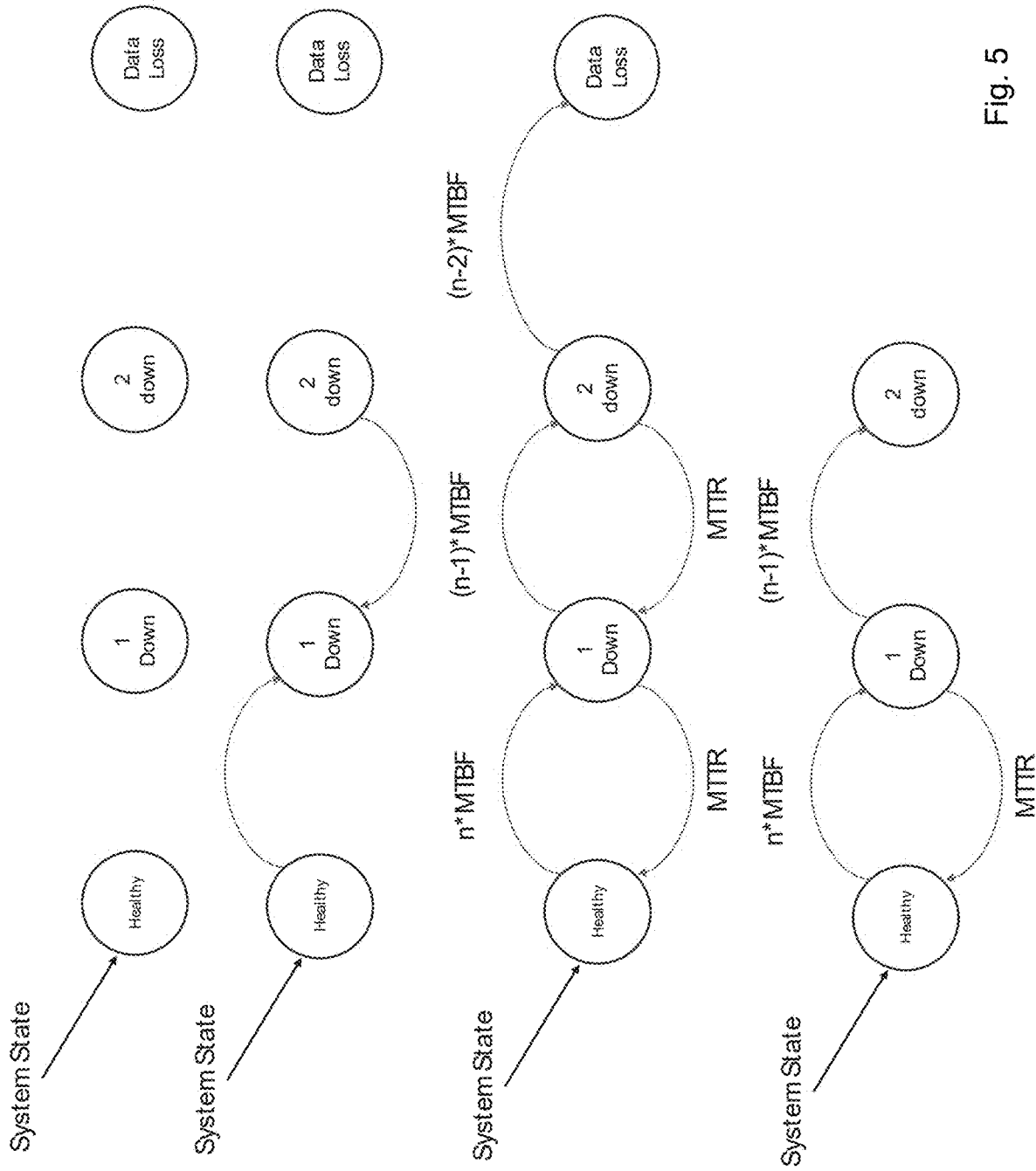
FIG. 5 illustrates states of a storage system and how they can be transitioned between each other, in accordance with one or more embodiments.

FIG. 5 illustrates states of a storage system and how they can be transitioned between each other, in accordance with one or more embodiments. The storage system transitions between different states, namely healthy, 1 down, 2 down, and data loss, over time. Healthy indicates that the storage system is fully functional, with no failures. 1 down indicates one node of the system has failed. 2 down indicates two nodes have failed. Data loss indicates the system can no longer recover data, and data loss occurs. Mean time between failure (MTBF) represents an average time between failures in the storage system. N*MTBF refers to an average time it takes for the first failure in the system, where n is a number of total nodes, (n−1)*MTBF represents the time it takes for the second failure to occur after the first failure, given that (n−1) nodes are left functioning. (n-2)*MTBF represents the time it takes for the third failure to occur after two failures have already happened. Mean time to repair (MTTR) represents the time it takes to repair a failed component or node in the system and restore the system to a healthy state.

As illustrated in FIG. 5, the storage system starts in a healthy state, meaning no nodes or components have failed. The storage system can stay in this state for n*MTBF, which is the mean time before a failure occurs across the entire system. After the first failure, the system transitions to the 1 down state. The system is still operational but one node has failed. If the failure is repaired within the MTTR, the system can go back to the heathy state. If another node fails before the first failure is repaired, the system moves into the 2 down state. The time to this transition is represented by (n−1)*MTBF. After a second failure, the system is now in the 2 down state. If the system can tolerate two failures (such as in erasure coding with 2 redundancy), it can still operate. The system can transition back to the 1 down state if one of the failed nodes is repaired within the MTTR. If a third failure occurs while the system is in the 2 down state, data is lost, and the system transitions to the data loss state. The time to this final failure is represented by (n−2)*MTBF. If a third failure occurs while the system is in the 2 down state, data is lost, and the system transitions to the data loss state. Once in this state, data is irrecoverable unless external backups or other recovery methods are in place.

Durability depends on the probabilities of transitioning between states. The factor in durability is how quickly the system can recover from failures (via MTTR) compared to how quickly subsequent failures occur (via MTBF). The longer the MTBF and the shorter the MTTR, the higher the durability of the system. If the system can repair components faster than failures occur, it is more likely to stay in the healthy or 1 down state, maintaining data durability. If multiple failures occur before the system can repair the previous failures, the likelihood of reaching the data loss state increases.

A redundant array of independent disks (RAID) is a data storage technology that combines multiple physical disk drives into a single logical unit to achieve improvements in data reliability. RAID systems use various techniques like data redundancy (through mirroring or parity) and striping (spreading data across multiple disks) to ensure data is protected from hardware failures and can be accessed quickly. Stripping is a technique where data is divided into smaller chunks and spread across multiple disks. This can improve performance because read/write operations are distributed over multiple disks, allowing for parallel access. Mirroring is a technique where data is duplicated and stored on more than one disk. This ensures that if one disk fails, the data is still available from the other disks. Parity is data used to recover lost data in case of a disk failure. Parity data is spread across multiple disks and helps reconstruct data from the remaining disks if one fails.

RAID levels refer to the different ways RIAD can be configured to provide various balances of fault tolerance, data redundancy, performance, and storage efficiency. Different RAID levels suit different needs, such as maximizing speed, ensuring data safety, or offering a balance between the two. In RAID 0, data is divided and written across multiple disks to improve read and write speeds, but no redundancy is provided. In RAID 1, the same data is written to two disks. If one disk fails, the other disk continues to function. RAID 5 and RAID 6 are erasure coding schemes, which use parity chunks to recover from disk failures. Parity is distributed across disks, allowing recovery of data if a disk fails (one disk in RAID 5, two disks in RAID 6). RAID 10 uses both RAID 1 mirroring (for redundancy) and RAID 0 striping (for performance). RAID 60 uses both RAID 0 (for striping) and RAID 6 (for redundancy).

MTTDL of a RAID system can be represented by:

$$MTTDL_{RAID} = \frac{(n-C-1)! * MTBF^{C+1}}{n! * MTTR^C} \qquad \text{Equation (1)}$$

where C is parity chunks, n is a number of data chunks, MTBF is an average time between successive failures in the system measured in hours, MTTR is an average time it takes to repair a failed node or disk in the RAID system.

As discussed above MTTDL represents an average time until the RAID system loses data due to multiple failures that exceed the redundancy built into the system. Equation (1) determines a likelihood of data loss by considering the number of parity chunks C, the number of data chunks n, and the time between failures (MTBF) and repairs (MTTR). The factorials (e.g., n!) reflect the combinatorial possibilities of failures occurring in the RAID system, a higher MTTDL indicates a more reliable system that is less likely to lose data over time.

MTTDL of a RAID 6 system can be represented by:

$$MTTDL_{R6} = \frac{MTBF^3}{n*(n-1)*(n-2)*MTTR^2} \qquad \text{Equation (2)}$$

where n is a number of data chunks, a number of parity chunks C is 2.

Because the number of parity chunks is 2, in Equation (2), MTTR is raised to the power of 2, indicting a combined time it takes to repair two failed components, and MTBF is raised to the power of 3=(2+1), indicating that RAID 6 can withstand up to two failures and still survive, but data is lost upon a third failure. the expression n*(n−1)*(n−2) reflects the decreasing number of available nodes as failure occur.

Distributed RAID is a RAID architecture that extends traditional RAID functionality by distributing both data and parity across multiple nodes in a distributed system rather than within a single RAID array, offering enhanced fault tolerance, scalability, and performance. For example, distributed RAID 6 combines the principles of RAID 6 with the distributed architecture. Similar to traditional RAID 6, distributed RAID 6 uses striping with double parity. Data is broken into chunks and written across multiple nodes, and two sets of parity data are calculated and stored. The parity data allows the system to recover from the failure of up to two nodes or disks. Distributed RAID 6 can handle two simultaneous failures (whether at the disk or node level). In the event of a failure, the system can reconstruct the lost data using the remaining data and the two sets of parity information.

MTTDL of a distributed RAID 6 system can be represented by:

$$MTTDL_{dR} = MTTDL_{R6} * \left(\frac{D}{n}\right)^{\frac{C*(C-1)}{2}} \qquad \text{Equation (3)}$$

where D is a total number of nodes in the distributed RAID 6 system, C is parity chunks, n is a number of data chunks.

Durability of the distributed RAID 6 system can be represented by:

$$\text{Durability} = e^{\frac{-t}{MTTDL_{dR}}} \quad \text{Equation (4)}$$

where t is years in hours.

9s of durability can be represented by:

$$\text{9s of durability} = -\log_{10}(1 - \text{Durability}) \quad \text{Equation (5)}$$

9s of durability is a measure used to express the durability of a system in terms of "nines." For example, five nines of durability means that the system is 99.999% durable. Equation (5) translates the durability probability into the number of "nines." A higher number of nines means the system has a very low probability of data loss.

For example, annualized failure rate (ARF) is 18%, where ARF represents the percentage chance that a disk will fail over the course of a year. A higher AFR indicates a higher likelihood of failure. MTBF can be calculated as a total operating time (in hours) in a year divided by the failure rate, i.e., MTBF=8760/18%=48666 hours, representing an average time between failures of a disk. Assuming object storage device (OSD) capacity is 162 terabyte (TB), data transfer rate during rebuild operations after a failure is 720 MB/s, n=10 (8+2) indicating that the RAID 6 configuration uses 8 data blocks and 2 parity blocks, and D=12 nodes indicating a total number of nodes in the distributed RAID system. Based on these parameters, MTTR=162*1024*1024/720/360=65.5 hours.

Applying the above example specification values to Equations (3)-(5), $$MTTDL_{R6} = \frac{48666^3}{10*(10-1)*(10-2)*65.5^2}$$

$$MTTDL_{R6} = 37313145$$

$$MTTDL_{dR} = MTTDL_{R6} * \left(\frac{12}{10}\right)^{\frac{2*(2-1)}{2}}$$

$$MTTDL_{dR} = 44775774$$

$$\text{Durability} = e^{\frac{-8760}{MTTDL_{dR}}} = 0.999804$$

$$9s \text{ of durability} = -\log_{10}(1 - 0.999804) = 3.7$$

As such, 9s durability of the storage system is 3.7 nines.

Figure 6:
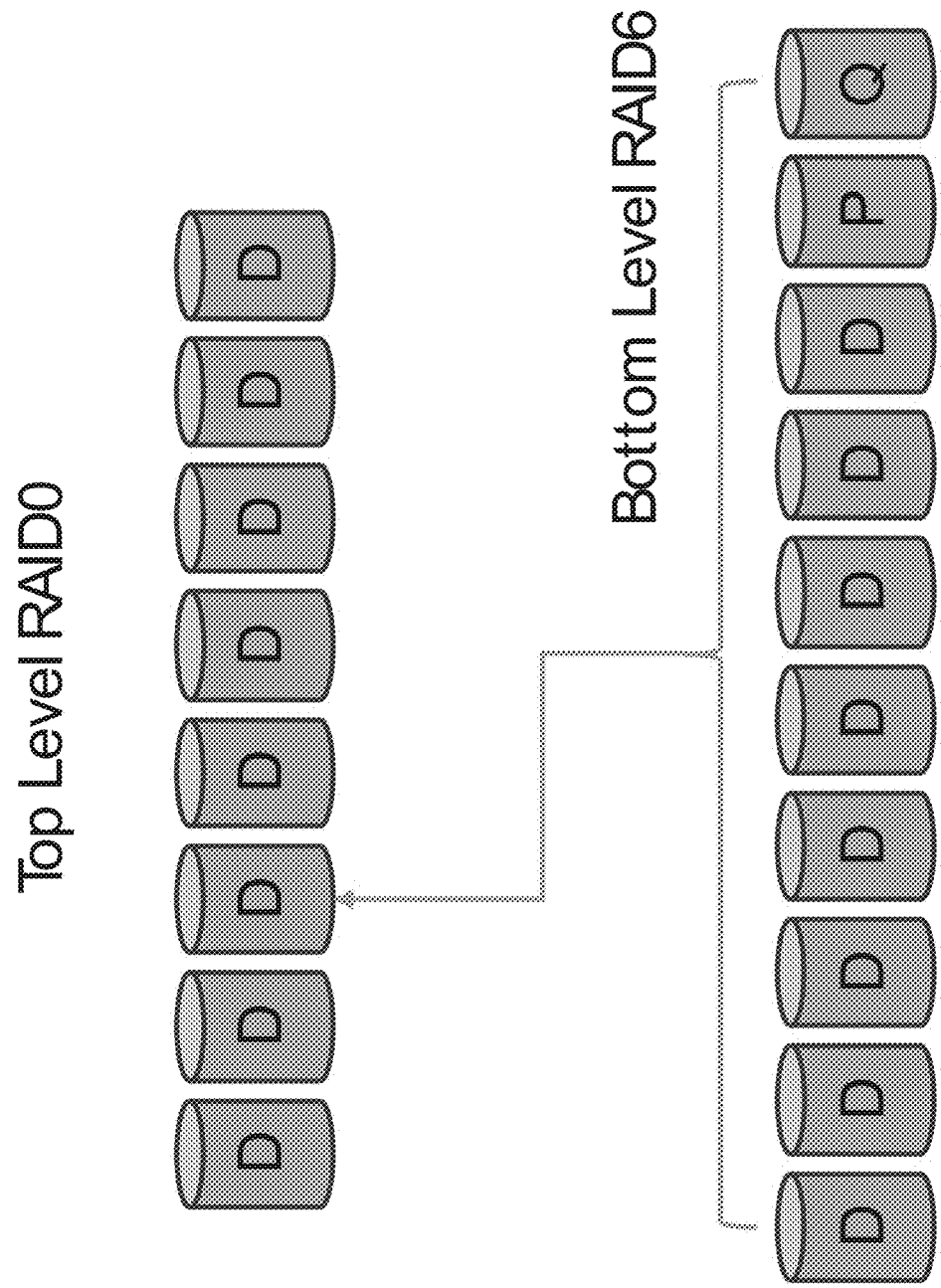
FIG. 6 illustrates an example 2-level configuration RAID 60, which combines RAID 0 and RAID 6, in accordance with one or more embodiments.

In some embodiments, a storage system is in a hierarchical configuration combining different RAID levels. FIG. 6 illustrates an example 2-level configuration RAID 60, which combines RAID 0 and RAID 6, in accordance with one or more embodiments. The system is configured with RAID 6 subsystem at a bottom level and RAID 0 subsystem at a top level, providing high fault tolerance from RAID 6 subsystem and performance from RAID 0 subsystem. Bottom level RAID 6 subsystem applies an 8+2 erasure configuration, meaning 8 data chunks (D) and 2 parity chunks (P and Q). RAID 6 subsystem can tolerate the failure of two disks. Top level RAID 0 subsystem stripes data across 8 data disks, corresponding to the 8 data disks of the RAID 6 subsystem. RAID 0 subsystem does not provide redundancy, meaning if a RAID 0 subsystem's disk fails, the system cannot recover the data. However, RAID 6 subsystem provides high durability.

Similar to the RAID 6 system described above, durability of the RAID 6 subsystem can be represented by:

$$MTTDL_{R6} = \frac{MTBF^3}{n*(n-1)*(n-2)*MTTR^2} \quad \text{Equation (2)}$$

$$\text{Durability} = e^{\frac{-t}{MTTDL_{dR}}} \quad \text{Equation (4)}$$

where MTBF is mean time between failures, n is a number of disks in the RAID 6 subsystem.

Durability for the RAID 0 subsystem can be represented by:

$$MTTDL_{R0} = n*\lambda \quad \text{Equation (6)}$$

$$MTBF = \frac{8760}{\lambda} \quad \text{Equation (7)}$$

where MTBF is mean time between failures, λ is a rate of failure for each RAID 6 array, n is a number of data chunks in the RAID 6 subsystem corresponding to the number of data disks in the RAID 6 subsystem and the number of data disks in the RAID 0 subsystem, 8760 is a number of hours in a year.

DETERMINING AVAILABILITY

As discussed above, reliability also includes availability. The availability of a storage system may also be determined based on the data storing scheme and a number of nodes. Referring back to FIG. 5, the storage system transitions between different states, namely, healthy, 1 down, 2 down, and not available. MTBF is an average time that a system operates before a failure occurs. The term n*MTBF represents the time until the first failure, and similarly, (n−1)*MTBF and (n−2)*MTBF represent the times until subsequent failures. MTTR is an average time required to repair or restore the system after a failure.

As illustrated, the system is initially in the heathy state. The system remains in this state until a failure occurs, with the time before failure being n*MTBF. After a first failure, the system transitions to the 1 down state, where one component has failed. If repairs are made within the MTTR, the system can return to the healthy state. If the repair is not made before another failure occurs (i.e., before (n−1)*MTBF), the system transitions to the 2 down state. In this state, two components have failed. The system can still return to a healthier state if repairs are made within the MTTR, allowing to go back to the 1 down state or eventually the healthy state. If a third failure occurs (i.e., before (n−2)*MTBF) and repairs have not been completed, the system transitions to the not available state. This is the failure state where the system is no longer operational, as too many failures have occurred without successful repair. Once the system reaches this state, availability is lost, and the system cannot function until repairs are made.

Availability is determined by how often the system can recover from failures and remain operational. It depends in part on MTBF and MTTR. A system has high availability if failures are infrequent (high MTBF), meaning it spends a long time in the healthy state, and/or repairs are quick (low MTTR), meaning the system can return to the healthy state quickly after a failure. As such, the system has multiple chances to recover as long as repairs are made within the MTTR. If the system successfully repairs failures after transitioning to 1 down or 2 down, it avoids the not available state and maintains availability. Notably, there are differences between durability and availability. Durability focuses on data preservation. Availability focuses on system uptime.

Data availability mean time to not available (MTTNA) of a storage system can be represented by:

$$MTTNA_{RAID} = \frac{(n-C-1)! * MTBF^{C+1}}{n! * MTTR^{C+1}} \quad \text{Equation (8)}$$

where C is a number of parity chunks, n is a number of servers, switches, etc.

MTTNA of a RAID 6 system can be represented by:

$$MTTNA_{R6} = \frac{MTBF^3}{n*(n-1)*(n-2)*MTTR^3} \quad \text{Equation (9)}$$

where n is a number of servers, switches, etc.

MTTNA of a distributed RAID 6 system can be represented by:

$$MTTNA_{dR} = MTTNA_{R6} * \left(\frac{D}{n}\right)^{\frac{C*(C-1)}{2}} \quad \text{Equation (10)}$$

where D is a total number of nodes in the distributed RAID 6 system, n is a number of servers, switches, etc.

Availability of the distributed RAID 6 system can be represented by:

$$\text{Availability} = e^{\frac{-t}{MTTNA_{dR}}} \quad \text{Equation (11)}$$

where t is years in hours.

9s of availability can be represented by:

$$9s \text{ of availability} = -\log_{10}(1 - \text{Availability}) \quad \text{Equation (12)}$$

9s of availability is a measure used to express the availability of a system in terms of "nines." For example, five nines of availability means that the system is 99.999% available. Equation (10) translates the availability probability into the number of "nines." A higher number of nines means the system has a very low probability of not available.

For example, annualized failure rate (ARF) is 5%, where ARF represents the percentage chance that a disk will fail over the course of a year. A higher AFR indicates a higher likelihood of failure. MTBF can be calculated as a total operating time (in hours) in a year (24×365) divided by the failure rate, i.e., MTBF=8760/5%=175200 hours, representing an average time between failures of a disk. Assuming MTTR is 24 hours, n=10 (8+2) indicating that the RAID 6 configuration uses 8 data blocks and 2 parity blocks, and D=12 nodes indicating a total number of nodes in the distributed RAID system.

Applying the above example specification values to Equations (10)-(12), $$MTTNA_{R6} = \frac{175200^3}{10*(10-1)*(10-2)*24^3}$$

$$MTTNA_{R6} = 5.403e8$$

$$MTTNA_{dR} = MTTNA_{R6} * \left(\frac{12}{10}\right)^{\frac{2*(2-1)}{2}}$$

$$MTTNA_{dR} = 6.4386e8$$

$$\text{Availability} = e^{\frac{-8760}{MTTNA_{dR}}} = 0.999986$$

$$9s \text{ of availability} = -\log_{10}(1-0.999986) = 4.8$$

As such, 9s of availability of the storage system is 4.8 nines.

As another example, annualized failure rate (ARF) is 1%, where ARF represents the percentage chance that a disk will fail over the course of a year. A lower AFR indicates a lower likelihood of failure. MTBF can be calculated as a total operating time (in hours) in a year (24×365) divided by the failure rate, i.e., MTBF=8760/1%=876000 hours, representing an average time between failures of a disk. Assuming MTTR is 72 hours, n=10 (8+2) indicating that the RAID 6 configuration uses 8 data blocks and 2 parity blocks, and D=10 nodes indicating a total number of nodes in the distributed RAID system.

Applying the above example specification values to Equations (10)-(12), $$MTTNA_{HA} = \frac{876000^2}{10*(10-1)*72^2}$$

$$MTTNA_{HA} = 1.64e6$$

$$\text{Availability} = e^{\frac{-8760}{MTTNA_{dR}}} = 0.994$$

$$9s \text{ of availability} = -\log_{10}(1-0.994) = 2.3$$

As such, 9s of availability of the data system is 2.3 nines.

Referring back to Equation (8), the factors that influence durability include the number of parity chunks (C) and the number of servers, switches (n). On the other hand, referring to Equation (8), availability is also associated with a number of OSDs (D). A greater number of OSDs also results in a greater availability.

EXAMPLE ARCHITECTURE OF DIRECTOR NODE

Existing storage systems are often configured at the outset based on failure rates provided by manufacturers. Once set, these configurations generally do not change, even as the real conditions under which the systems operate begin to diverge from initial assumptions. This rigidity can lead to suboptimal performance and reliability. For example, manufacturers provide failure rates based on controlled tests or historical data, which may not accurately reflect the failure rates in actual usage scenarios. Variables such as different operational workloads, environmental conditions, or variations in component batches can lead to higher or lower actual failure rates than those initially assumed. Because of the static nature of initial configurations, systems can end up being either overprotected or under protected. Overprotection leads to unnecessary costs as more resources than needed are allocated to ensure reliability. Under protection, on the other hand, increases the risk of data loss or system failures, as the system may not have enough redundancy or fail-safes in place to handle unexpected component failures.

Figure 7:
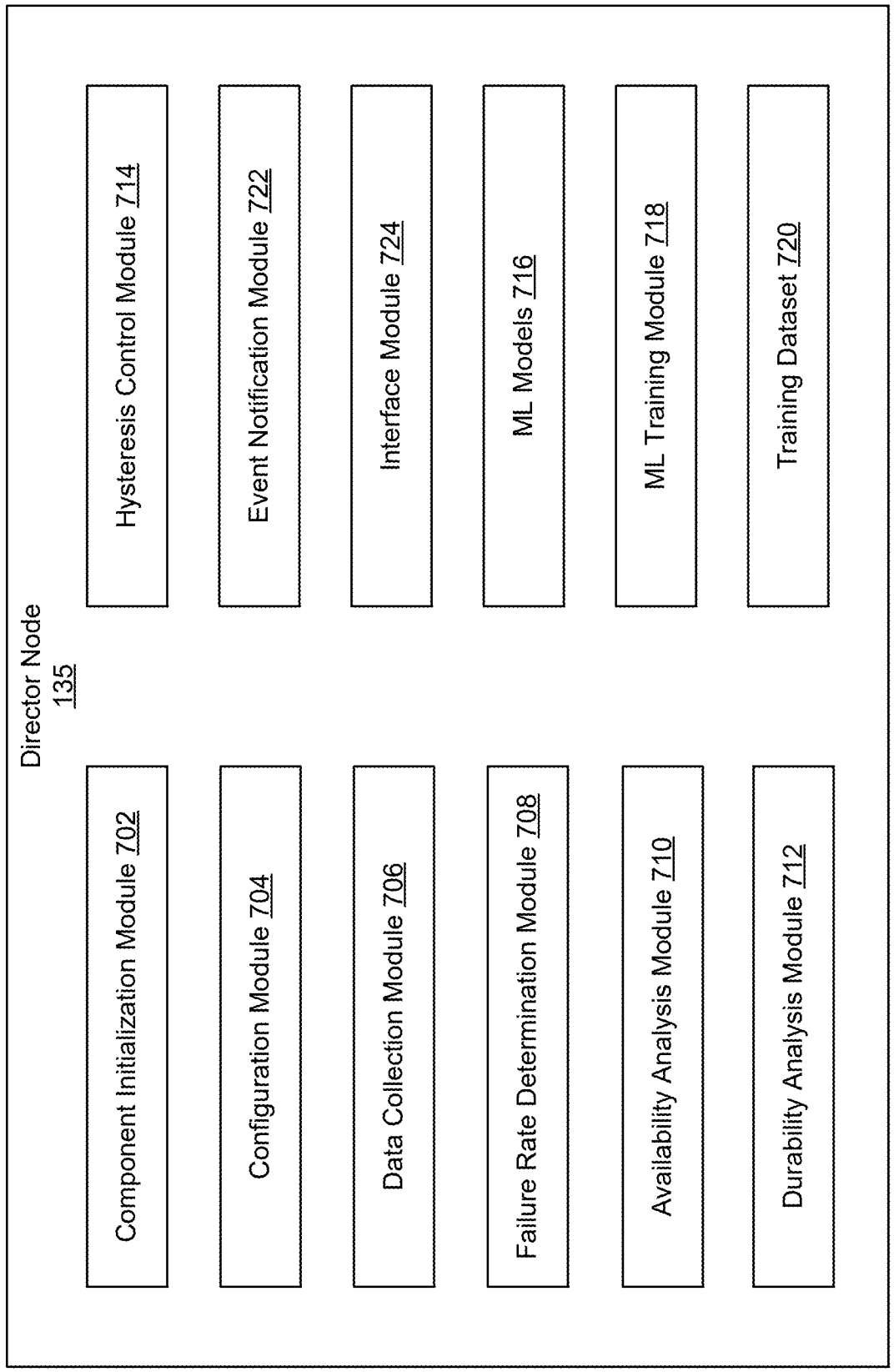
FIG. 7 illustrates an example architecture of a director node in accordance with one or more embodiments.

The embodiments described herein address the above-described problem through a dynamic, adaptive approach that continuously monitors and adjusts to actual operational conditions. FIG. 7 illustrates an example architecture of a director node 135 (which may correspond to any director node 135a-d or a combination of multiple director node 135a-d), in accordance with one or more embodiments. As described above with respect to FIG. 1, a director node 135 forms a control plane of the storage system. The director node 135 may orchestrate the overall operations of the storage system by coordinating file access (such as directing client systems 130 to the appropriate storage nodes 120 for reading/writing data), and maintaining metadata (such as directories, file attributes, and access permissions). In addition, the director node 135 may also track the availability and status of storage nodes 120 in clusters to detect failures and initiate recovery processes. Further, the director node 135 may also configure and adjust erasure coding schemes to balance performance and redundancy based on the current failure rates of the storage devices.

As illustrated in FIG. 7, the director node 135 may include a component initialization module 702, a configuration module 704, a data collection module 706, a failure rate determination module 708, a reliability analysis module 710, a durability analysis module 712, hysteresis control module 714, an event notification module 722, and an interface module 724.

The component initialization module is configured to setting up and registering all storage devices within the storage system during installation or system upgrades. This may include initializing metadata for newly added storage devices in storage nodes 120. For example, when a new storage device is added to the storage system, a failure rate based on manufacturer specification may be received by the component initialization module.

The configuration module 704 is configured to manage or set and/or modify erasure coding schemes based on specified reliability metrics, such as a minimum durability level and a minimum availability level. For a new storage device that is just added to the storage system, the configuration module 704 may be configured to set an erasure coding scheme based on the failure rate provided by the manufacturer specification. Later, when actual failure data is collected for the storage device, the configuration module 704 is configured to modify the erasure coding schemes based on the actual failure data.

The data collection module 706 is configured to continuously monitors and gathers operational data from storage nodes. The data collected from individual storage nodes may be aggregated into a centralized repository that is accessible to other modules, such as the failure rate determination module 708, reliability analysis module 710, and durability analysis module 712. The operational data may include (but is not limited to) failure events, device health metrics, performance data, and system utilization data. Failure events may include device failures, (e.g., HDD or SSD crashes), node outages or disconnections, unexpected system reboots or errors. Device health metrics may include temperature readings for storage devices, percentage of storage device used, a total amount of data written to a storage device, a number of erase cycles experienced by a storage device, a percentage of spare blocks available to replace worn-out blocks of a storage device, data integrity errors during internal operations, The failure rate determination module 708 is configured to process the collected data from storage nodes 120 to determine failure rates for individual storage devices. A failure rate quantifies a likelihood of a device failure over a specified time period, such as annualized failure rate (AFR). The failure rate determination module 708 may use operational data collected by the data collection module 706, such as failure events, device health metrics, operational hours, and/or environment conditions, to determine a failure rate. The failure rate determination module 708 may aggregate data from multiple storage nodes into a centralized repository. In some embodiments, the device health metrics are normalized for consistency, such as scaling temperatures to a common unit or converting time-based metrics to standardized periods (e.g., hours, days). The failure rate determination module 708 may use operational timelines (e.g., failure events per year) to compute time-based failure rates, such as Annualized failure rate (AFR). In some embodiments, AFR may be determined based on the following equation:

$$AFR = \frac{\text{Numer of Failures in a Year}}{\text{Total Device Hours/Year}} \times 100 \qquad \text{Equation (13)}$$

AFR is a measure of the percentage of devices that fail in a year, based on observed failure rates over a period (which may be shorter or longer than a year). In some embodiments, data of multiple devices of a same time that share a same batch number from a same manufacturer are pooled together to determine an AFR for that type of device in that batch. In some embodiments, data collected over a rolling window of a predetermine period (e.g., a month, a few months) is used to determine a current AFR. In some embodiments, an AFR is determined at a predetermined frequency, e.g., every day, every week, every month.

In some embodiments, patterns may be detected in failure rates over time, such as increased failures in older devices, and/or correlation between environmental conditions (e.g., high temperatures, vibration, high usage, or excessive erase cycles) and failure rates. The failure rate determination module 708 may identify trends such as increasing failure probability with wear-out indicators (e.g., reduced spare blocks or increased write operations). In some embodiments, the failure rate determination module 708 may apply one or more machine learning models 716 trained on historical failure data to predict future failure rates.

In some embodiments, the failure rate determination module 708 may leverage contextual information (e.g., timestamps and system logs) to attribute failure events to specific causes. For example, the timestamps indicate exactly when a failure occurred. System logs may include error messages, alerts or warnings related to device health, environmental context (e.g., temperature, humidity, or vibration levels), operational commands issued to the device, and power interruptions or reboots. The timestamps can be correlated with system events, environmental changes, or usage patterns extracted from the system logs.

In some embodiments, failure rates may be clustered and/or differentiated based on device type, model, batch number, and workload intensity. In some embodiments, the failure rate determination module 708 may output an AFR for each individual storage device. Alternatively, or in addition, the failure rate determination module 708 may output failure rates for each device category, model, and/or manufacture batch.

In some embodiments, the failure rate determination module 708 may determine trends such as increasing failure rates for older devices or specific models. Order devices may show increasing failure rates as they approach or exceed their expected lifespan. Certain device models or manufacturers may exhibit higher failure rates due to design flaws, manufacturing defects, or differences in component quality. Devices with higher usage or operating in harsher conditions may also experience faster wear and thus higher failure rates. The failure rate determination module 708 may analyze failure data relative to a device (or a type of device)'s operational age. For example, the failure rate determination module 708 may determine that SSDs begin to fail more frequently after reaching 80% of their write endurance limit. The failure rate determination module 708 may also identify specific models with disproportionately high failure rates, e.g., Model XX might show a failure rate of 10% after 2 years, compared to 3% for other models of the same age.

The availability analysis module 710 is configured to determine the availability level of the storage system based on failure rates, performance metrics, and/or system configurations. Notably, higher failure rates typically reduce availability since devices spend more time in failure states. Further, system throughput, latency, fault-tolerance mechanisms, or recovery time may also influence availability. In some embodiments, the availability analysis module 710 may be configured to determine MTTNA for the storage system. For example, a more robust configuration (e.g., RAID 6) can maintain higher availability compared to a less robust configuration (e.g., RAID 5) even when multiple device fail.

As described above, MTTNA is a metric often used to measure the average time it takes for a node or storage device in a system to become available again after an outage or failure. MTTNA can be determined according to Equations (8)-(10), and availability level can be determined according to Equations (11)-(12) described above. A lower MTTNA indicates a better recovery mechanism and higher system availability.

The durability analysis module 712 is configured to determine the durability of the storage system based on failure rates, performance metrics, and/or system configurations. Durability refers to the long-term reliability of a storage system associated with the storage system's ability to maintain data integrity even in the presence of hardware failures. Factors like rebuild time and system recovery speed affect the likelihood of preventing data loss after a failure. For example, a long RAID rebuild time increases the window of vulnerability to subsequent failures, which can result in data loss. Further, redundancy mechanisms, such as RAID levels or replication strategies, also impact durability. For example, RAID 6 with dural parity offers greater durability than RAID 5 due to its ability to tolerate two simultaneous failures.

In some embodiments, the durability analysis module 712 may be configured to determine MTTDL for the storage system. As described above, MTTDL is a metric that quantifies an average time until a failure event leads to data loss in the storage system. MTTDL can be determined according to Equations (1)-(3), and durability level can be determined according to Equations (4)-(5) described above. Higher MTTDL indicates a more durable storage system, which can withstand a greater number of failures without losing data.

The configuration module 704 may then modify the erasure coding configurations based on the determined current availability level and durability level of the storage system. In response to determining that the current availability level or durability level is lower than the specified minimum availability level or durability level, the configuration module 704 may modify the erasure coding configuration to cause the availability level and/or durability level increase, and vice versa. For example, the current erasure coding configuration is N+2 (which stores 2 parity block for N data blocks), and the determined current availability level or durability level is lower than the specified minimum availability level or durability level, the configuration module 704 may modify the erasure coding configuration to N 8+3 (which stores 3 parity blocks for N data blocks).

Notably, the metrics (e.g., availability or durability levels) may fluctuate frequently due to various factors inherent to the complexity and dynamic nature of storage systems. To prevent unnecessary or frequent configuration changes, the director node 135 may also include an hysteresis control module 714. The hysteresis control module 714 is configured to prevent frequent or unnecessary changes to configurations based on minor fluctuations in performance or reliability metrics. The hysteresis control module 714 may introduce thresholds and time delays to validate trends before triggering adjustments, reducing the likelihood of oscillations between configurations. For example, if the storage system detects a temporary increase in failure rates, this module 714 ensures that changes to erasure coding or redundancy levels occur only if the trend persists for a predetermined period to help balance responsiveness and system stability, optimizing resource use and performance.

The event notification module 722 is configured to alert system administrators to critical events and system conditions. The critical events and system conditions may include (but are not limited to) device failures, performance degradation, and system configuration changes. Alerts may be communicated through various channels, such as (but not limited to) email, SMS, and dashboard updates, ensuring administrators can respond promptly. In some embodiments, the event notification module 722 provides detailed logs and recommended actions for each event, enabling efficient issue resolution and system maintenance.

The interface module 724 is configured to provide an interface that allow system administrators to interact with the storage system. The interface may be a graphical user interface (GUI) and/or a command line interface (CLI) for system configuration, monitoring, and trouble shooting. In some embodiments, the interface may also include an application programming interface (API) for integration with external tools and applications.

For example, an event may be that a storage device or node has failed. Responsive to the failure, the configuration module 704 may trigger data reconstruction using erasure coding or other redundancy mechanisms. The configuration module 704 may also isolate the failure device or node from the system to prevent further degradation and notify administrators to replace the failed hardware component. The configuration module 704 may also reallocate workloads to other nodes to maintain system performance, and verify the availability of spare space on other nodes for reconstruction. In some embodiments, these actions may be sent to administrators along with the detected event via the event notification module 722. Alternatively, or in addition, these actions may also be accessible by the administrators via the interface module 724.

In some embodiments, the director node 135 may also include one or more machine learning models 716. In some embodiments, the one or more machine learning models 716 includes a model trained to receive operational data for each storage device and specified minimum reliability metrics (e.g., minimum availability level and/or durability level) as input, and to output an erasure coding configuration that meets the minimum reliability metrics for the storage system. For example, input features of the machine learning model may include metrics like failure rates (e.g., AFR), mean time to failure (MTTF), mean time to repair (MTTR), device usage statistics, and workload distribution.

In some embodiments, the one or more machine learning models 716 includes a model trained to receive operational data for each storage device (including historical event logs and environmental factors) and erasure coding configuration as input, and to output a current availability level and/or durability level of the system. In some embodiments, the model may also be trained t output a risk score indicating a likelihood of an individual device's failure within a predetermined timeframe (e.g., a day, a week, a month). Such output may also be used to generate notifications or recommendations for proactive maintenance. For example, the system may identify components (e.g., aging drives) for replacement to reduce risk.

In some embodiments, the machine learning models 716 may also include a model trained to simulate how a storage system performs under different conditions and failure scenarios. The simulations explore how the storage system behaves under different failure conditions, such as single or multiple drive failures. For example, for a single drive failure, the system can model the impact of a single drive failure on the storage array, and evaluates how redundancy mechanisms (e.g., RAID configurations) respond. The one or more machine learning models 716 can also predict a rebuild time (e.g., how long it will take to restore redundancy), and a vulnerability window (e.g., how exposed the system is to additional failures during the rebuild), and performance impact (e.g., whether the degraded state affect system throughput or latency).

As another example, for a multiple drive failure, the one or more machine learning models 716 can also simulate simultaneous or sequential failures of multiple drives. The system can also predict a progressive degradation scenario where drives fail one after another over time where drives fail faster during rebuild due to increased workload. The system can explore the limits of the redundancy mechanisms (e.g., RAID 6 can handle up to 2 simultaneous failures but fails at 3). The system can also predict the likelihood of data loss under current failure rates and rebuild times.

In some embodiments, the machine learning models 716 are trained offline or by another device and then deployed onto the director node 135. Alternatively, the machine learning models 716 are trained by the director node 135, which further includes a machine learning training module 718 and a training dataset 720. The training dataset 720 includes data collected by the data collection module 706, reliability metrics (e.g., availability levels and/or durability levels) and past configurations of erasure coding (e.g., N+2, N+3). As more data is collected, the system can retrain the machine learning models 716 based on the newly collected data. The retraining may be triggered at a predetermined frequency (e.g., each week, each month), or based on an amount of available new training data. As such, the machine learning model continues to improve and adapt to recently collected data, more accurately predicting failures and/or providing better recommendations on erasure coding configurations.

EXAMPLE METHOD FOR MANAGING STORAGE SYSTEMS BASED ON DEVICE FAILURES

Figure 8:
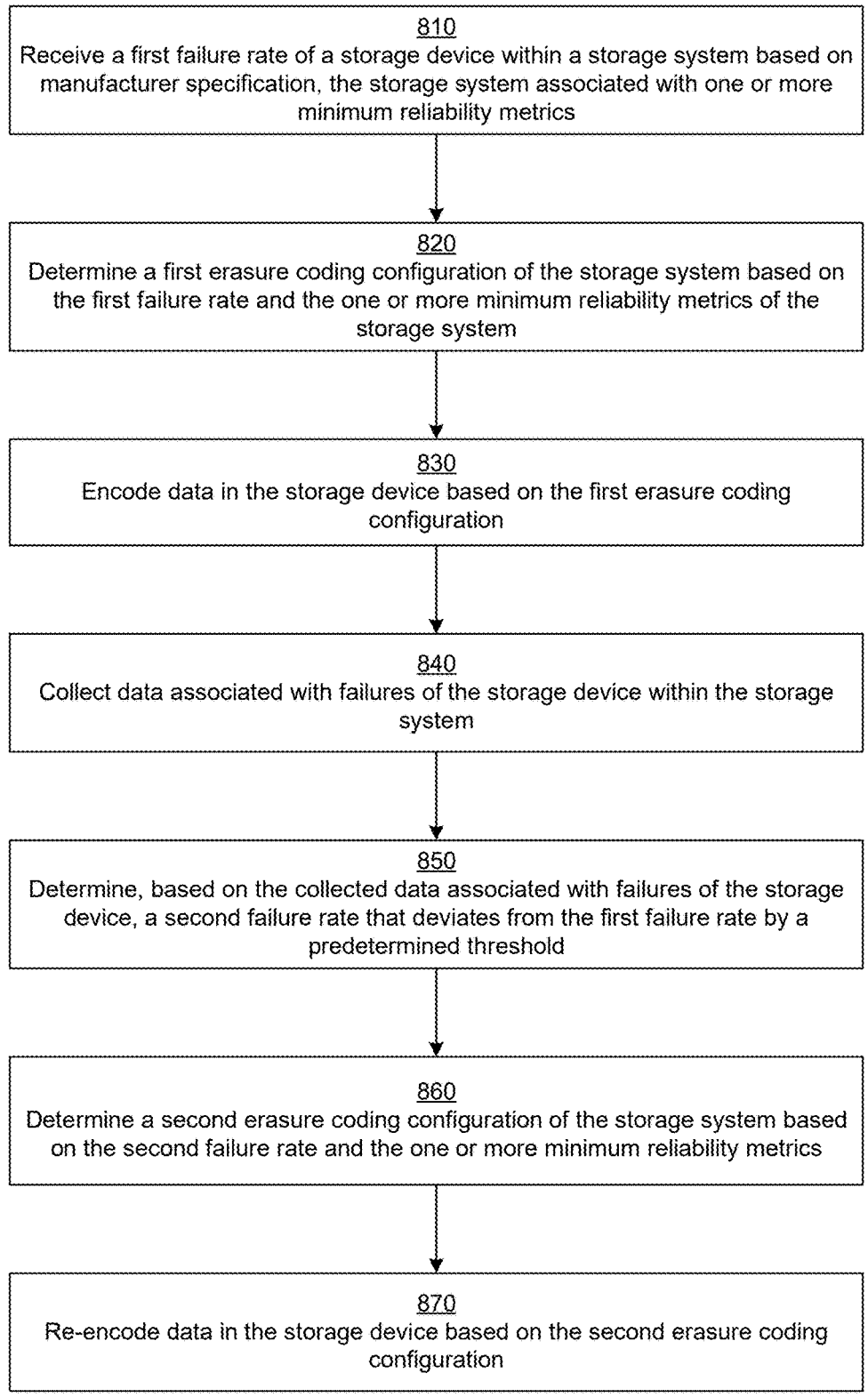
FIG. 8 is a flowchart of an example method for managing storage system based on failure rates of storage devices, in accordance with one or more embodiments.

FIG. 8 is a flowchart of an example method 800 for managing storage systems based on data associated with device failures, in accordance with one or more embodiments. The steps in the method 800 may be performed in any sequence. In some embodiments, more or fewer steps may be included in the method 800. The method 800 may be performed by a computing system, e.g., a storage system or a director node 135 described herein with respect to FIGS. 1-7.

The storage system receives 810 a first failure rate of a storage device within a storage system based on manufacturer specification. The failure rate may represent a predicted likelihood of failures, such as annualized failure rate (AFR), mean time to failure (MTTF), etc. The storage system is associated with one or more minimum reliability metrics, such as a minimum availability level and/or a minimum durability level. In some embodiments, the one or more reliability metrics may be input by users. Alternatively, or in addition, the one or more reliability metrics may be automatically set by the storage system based on attributes of applications.

A minimum availability level refers to a predefined threshold or target for how often a storage system mut remain operational and accessible over a given time period, and it is the lowest acceptable percentage of operational time the system should maintain. A minimum availability level may be expressed in terms of "nines": 90% (1 nine) corresponds to 36.5 days of down time per year; 99% (2 nines) corresponds to 3.65 days of downtime per year; 99.9% (3 nines) corresponds to 8.76 hours of downtime per year; 99.99% (4 nines) corresponds to 52.56 minutes of downtime per year; and 99.999% (5 nines) corresponds to 5.26 minutes of downtime per year.

A minimum durability level refers to a predefined threshold or target for a likelihood that data stored in a storage system remains intact and free from loss over a given period of time, and it is the lowest acceptable probability of data preservation for the storage system. A minimum durability level may also be expressed in terms of "nines": 99% (2 nines) corresponds one out of 100 systems may experience data loss; 99.9% (3 nines) corresponds to one out of 1000 systems may experience data loss; 99.999% (5 nines) corresponds to one out of 100,000 systems may experience data loss; and so on.

The storage system determines 820 a first erasure coding configuration of the storage system based on the first failure rate and the one or more minimum reliability metrics of the storage system. Determining the first erasure coding configuration based on failure rates and minimum reliability metrics (such as minimum availability and durability levels) includes balancing redundancy, storage efficiency, and the system's ability to tolerate failures while meeting predefined reliability requirements. In some embodiments, the first erasure coding configuration includes storing data in a first number of data chunks and a second number of parity chunks.

In some embodiments, as described above with respect to Equations (1)-(5), the first failure rate may be used to determine a first mean time to data loss (MTTDL) of the storage system, and the first erasure coding configuration of the storage system may then be determined based on the first MTTDL and the minimum durability level. For example, assume a storage device has an AFR of 18% and a minimum durability requirement of 3 "nines." An AFR of 18% corresponds to a mean time between failures (MTBF) of 48,666 hours (=8760/0.18). If the storage configuration is RAID 6 with an 8+2 erasure coding scheme, where 8 represents 8 data blocks and 2 represents 2 parity blocks, the MTTDL is 37,313,145 hours, and the resulting durability level is 99.9804%, which equates to 3.6 "nines," meeting the minimum durability requirement of 3 "nines".

In some embodiments, the first failure rate is used to determine a first mean time to not available (MTTNA) of the storage system, and the first erasure coding configuration of the storage system is determined based on the first MTTNA and the minimum availability level. Assume a storage device has an AFR of 5% and a minimum availability requirement of 4 "nines." An AFR of 5% corresponds to a MTBF of 175,200 hours (=8760/0.05). If the storage configuration is RAID 6 with an 8+2 erasure coding scheme, the MTTNA is 5.403×10^8 hours, and the resulting availability level is 99.9986%, which equates to 4.8 "nines," meeting the minimum availability requirement of 4 "nines".

The storage system encodes 830 data in the storage device based on the first erasure coding configuration. Encoding data based on the first erasure coding configuration may include breaking the data into smaller chunks, generating redundancy (parity) chunks, and distributing these chunks across multiple storage devices to ensure reliability and fault tolerance. For example, in an 8+2 configuration, the data is divided into 8 equal-sized data chunks. The system calculates 2 parity chunks using an erasure coding algorithm, such as Reed-Solomon coding. Parity chunks store redundant information that allows the original data to be reconstructed even if some data chunks are lost or corrupted. Each chunk is stored on a different failure domain (e.g., separate storage devices, nodes, or locations) to minimize the risk of simultaneous failure. In some embodiments, the distribution follows a erasure coding map, which specifies the physical locations for each chunk. The data and parity chunks are written to their assigned storage devices simultaneously or in parallel to optimize performance. For an 8+2 configuration, up to 2 chunks can be lost without data loss.

The storage system collects 840 data associated with failures of the storage device within the storage system. In some embodiments, the storage system collects failure data by continuously monitoring the operational data of all storage devices. This includes real-time tracking of key metrics such as device health attributes, error rates (e.g., read/write errors, checksum mismatches), and environmental conditions like temperature, vibration, and power fluctuations. When a failure occurs, detailed logs are generated, capturing the failure type, timestamp, affected device, and contextual information. These logs are aggregated into a centralized repository for further analysis, enabling the identification of trends and correlations across the system. In some embodiments, the storage system may also capture and analyze performance metrics, including workload patterns and device utilization, to understand potential stressors causing failures.

The storage system determines 850, based on the collected data associated with failures of the storage device, a second failure rate that deviates from the first failure rate by a predetermined threshold. The storage system determines 860 a second erasure coding configuration of the storage system based on the second failure rate and the one or more minimum reliability metrics. The storage system re-encodes 870 data in the storage device based on the second erasure coding configuration.

In some embodiments, the storage system determines a second MTTDL based on the second failure rate, determines a current durability level of the storage system based on the second MTTDL, and determines whether the current durability level deviates from the minimum durability level by more than a threshold amount. Responsive to determining that the current durability level deviates from the minimum durability level by more than the threshold amount, the system determines the second erasure coding configuration of the storage system based on the second MTTDL and the minimum durability level.

Similarly, in some embodiments, the system may also determine a second MTTNA based on the second failure rate, determines a current availability level based on the second MTTNA, and determines whether the current availability level deviates from the minimum availability level by more than a threshold amount. Responsive to determining that the current availability level deviates from the minimum availability level by more than the threshold amount, the storage system determines the second erasure coding configuration of the storage system based on the second MTTNA and the minimum availability level.

Note, this deviation from the minimum durability/availability level may be positive (indicating the current durability/availability level is greater than the minimum durability/availability level) or negative (indicating the current durability/availability level is lower than the minimum durability/availability level). In some embodiments, two different thresholds (e.g., a first threshold for positive deviation, and a second threshold for negative deviation) are implemented.

In either case (positive deviation or negative deviation), erasure coding configuration may be adjusted. In positive deviation, a current redundancy configuration provides more protection than necessary. Higher redundancy increases storage overhead, as additional parity chunks consumer extra storage capacity. For example, a 6+4 erasure coding configuration (6 data chunks, 4 parity chunks) could be reduced to 8+2 erasure coding configuration (8 data chunks, 2 parity chunks) if the additional parities are unnecessary. As such, the new configuration allows the storage systems to consume less storage capacity. Further, writing and maintaining parity chunks requires computational and I/O resources. Reducing parity also reduces the computational load, leading to faster write speeds and lower latency.

In some embodiments, determining the second erasure coding configuration of the storage system includes applying a machine learning model to the collected data associated with failures of the storage device within the storage system. The machine learning model is trained, using historical data associated with the storage devices, corresponding erasure coding configurations, and reliability metrics, to receive data associated with failures of a category of storage device and specified one or more minimum reliability metrics as input to output an erasure coding configuration that can provide the specified one or more minimum reliability metrics using the particular storage device.

In some embodiments, the storage system further includes a hysteresis control mechanism (e.g., hysteresis control module 714) configured to prevent excessive or frequent adjustments to the storage system's configuration. The hysteresis control mechanism may include a buffer duration around the thresholds for triggering changes to avoid overreactions or constantly oscillating between configurations in response to marginal changes.

The above described process may repeat continuously to form a feedback loop, allowing for dynamic adjustments to redundancy configurations, such as modifying erasure coding configurations. This dynamic approach ensures that the system remains efficient and meets the predefined durability and availability requirements.

EXAMPLE COMPUTER SYSTEM

Figure 9:
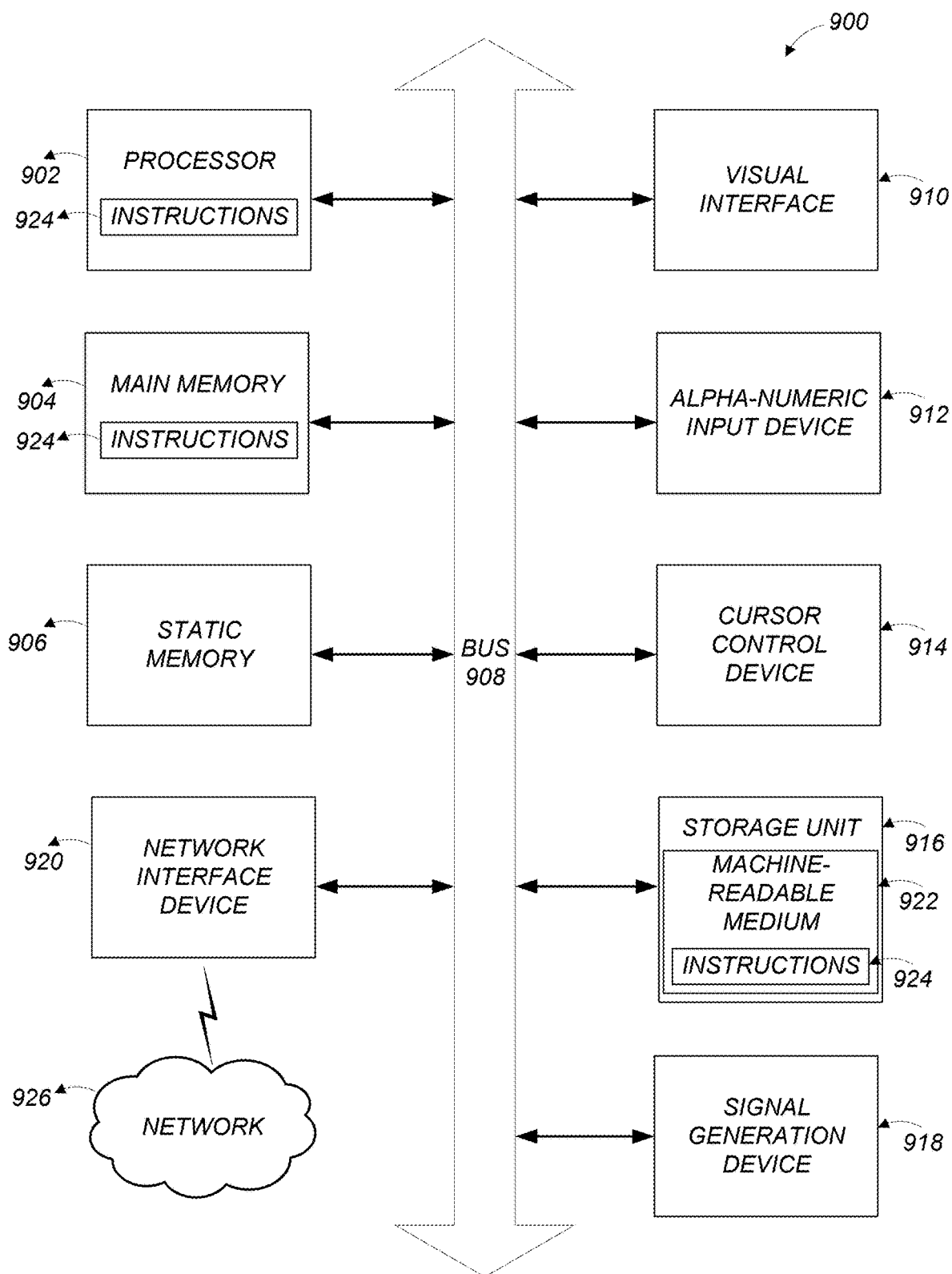
FIG. 9 is a block diagram illustrating components of an example computing system that is able to read instructions from a machine-readable medium and execute them in a processor (or controller) in accordance with one or more embodiments.

FIG. 9 is a block diagram illustrating components of an example machine able to read instructions from a machine-readable medium and execute them in a processor (or controller). Specifically, FIG. 9 shows a diagrammatic representation of a machine in the example form of a computer system 900 within which program code (e.g., software) for causing the machine to perform any one or more of the methodologies discussed herein may be executed. The program code may be comprised of instructions 924 executable by one or more processors 902. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processors 902 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 904, and a static memory 906, which are configured to communicate with each other via a bus 908. The computer system 900 may further include visual display interface 910. The visual interface may include a software driver that enables (or provide) user interfaces to render on a screen either directly or indirectly. The visual interface 910 may interface with a touch enabled screen. The computer system 900 may also include input devices 912 (e.g., a keyboard a mouse), a cursor control device 914, a storage unit 916, a signal generation device 918 (e.g., a microphone and/or speaker), and a network interface device 920, which also are configured to communicate via the bus 908.

The storage unit 916 includes a machine-readable medium 922 (e.g., magnetic disk or solid-state memory) on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method for managing storage systems, comprising:
   receiving a first failure rate of a storage device within a storage system based on manufacturer specification, the storage system associated with one or more minimum reliability metrics;
   determining a first erasure coding configuration of the storage system based on the first failure rate and the one or more minimum reliability metrics of the storage system;
   encoding data in the storage device based on the first erasure coding configuration;
   collecting data associated with failures of the storage device within the storage system;
   determining, based on the collected data associated with failures of the storage device, a second failure rate that deviates from the first failure rate by a predetermined threshold;
   determining a second erasure coding configuration of the storage system, different from the first erasure coding configuration, based on the second failure rate and the one or more minimum reliability metrics;
   re-encoding data in the storage device based on the second erasure coding configuration.

2. The computer-implemented method of claim 1, wherein the first erasure coding configuration of the storage system includes storing data in a first number of data chunks and a second number of parity chunks, and the second erasure coding configuration of the storage system is determined by modifying the first number of data chunks or the second number of parity chunks.

3. The computer-implemented method of claim 2, wherein the second erasure coding configuration of the storage system is determined by modifying a ratio of the first number of data chunks relative to the second number of parity chunks.

4. The computer-implemented method of claim 1, wherein the one or more minimum reliability metrics includes at least one of a minimum durability level or a minimum availability level.

5. The computer-implemented method of claim 4, further comprising:
determining a first or second mean time to data loss (MTTDL) of the storage system based on the respective first or second failure rate; and
determining the first or second erasure coding configuration of the storage system based on the respective first or second MTTDL and the minimum durability level.

6. The computer-implemented method of claim 5, further comprising:
determining a current durability level of the storage system based on the second MTTDL;
determining whether the current durability level deviates from the minimum durability level by more than a threshold amount; and
responsive to determining that the current durability level deviates from the minimum durability level by more than the threshold amount, determining the second erasure coding configuration of the storage system based on the second MTTDL and the minimum durability level.

7. The computer-implemented method of claim 4, further comprising:
determining a first or second data availability mean time to not available (MTTNA) of the storage system based on the respective first or second failure rate; and
determining the first or second erasure coding configuration of the storage system based on the respective first or second MTTNA and the minimum availability level.

8. The computer-implemented method of claim 7, further comprising:
determining a current availability level of the storage system based on the second MTTNA;
determining whether the current availability level deviates from the minimum availability level by more than a threshold amount; and
responsive to determining that the current availability level deviates from the minimum availability level by more than the threshold amount, determining the second erasure coding configuration of the storage system based on the second MTTNA and the minimum availability level.

9. The computer-implemented method of claim 1, wherein determining the second erasure coding configuration of the storage system based on the second failure rate and the one or more minimum reliability metrics includes:
applying a machine learning model to the collected data associated with failures of the storage device within the storage system, wherein the machine learning model is trained using historical data associated with storage devices, corresponding erasure coding configurations, and reliability metrics, to receive data associated with failures of a category of storage devices and specified one or more minimum reliability metrics as input to output an erasure coding configuration that can provide the specified one or more minimum reliability metrics using the storage devices of the category.

10. A non-transitory computer-readable storage medium storing instructions that when executed by one or more computer processors, cause the one or more computer processors to perform steps comprising:
receiving a first failure rate of a storage device within a storage system based on manufacturer specification, the storage system associated with one or more minimum reliability metrics;
determining a first erasure coding configuration of the storage system based on the first failure rate and the one or more minimum reliability metrics of the storage system;
encoding data in the storage device based on the first erasure coding configuration;
collecting data associated with failures of the storage device within the storage system;
determining, based on the collected data associated with failures of the storage device, a second failure rate that deviates from the first failure rate by a predetermined threshold;
determining a second erasure coding configuration of the storage system, different from the first erasure coding configuration, based on the second failure rate and the one or more minimum reliability metrics;
re-encoding data in the storage device based on the second erasure coding configuration.

11. The non-transitory computer-readable storage medium of claim 10, wherein the first erasure coding configuration of the storage system includes storing data in a first number of data chunks and a second number of parity chunks, and the second erasure coding configuration of the storage system is determined by modifying the first number of data chunks or the second number of parity chunks.

12. The non-transitory computer-readable storage medium of claim 11, wherein the second erasure coding configuration of the storage system is determined by modifying a ratio of the first number of data chunks relative to the second number of parity chunks.

13. The non-transitory computer-readable storage medium of claim 10, wherein the one or more minimum reliability metrics includes at least one of a minimum durability level or a minimum availability level.

14. The non-transitory computer-readable storage medium of claim 13, further comprising:
determining a first or second mean time to data loss (MTTDL) of the storage system based on the respective first or second failure rate; and
determining the first or second erasure coding configuration of the storage system based on the respective first or second MTTDL and the minimum durability level.

15. The non-transitory computer-readable storage medium of claim 14, further comprising:
determining a current durability level of the storage system based on the second MTTDL;
determining whether the current durability level deviates from the minimum durability level by more than a threshold amount; and
responsive to determining that the current durability level deviates from the minimum durability level by more than the threshold amount, determining the second erasure coding configuration of the storage system based on the second MTTDL and the minimum durability level.

16. The non-transitory computer-readable storage medium of claim 13, further comprising:
determining a first or second data availability mean time to not available (MTTNA) of the storage system based on the respective first or second failure rate; and
determining the first or second erasure coding configuration of the storage system based on the respective first or second MTTNA and the minimum availability level.

17. The non-transitory computer-readable storage medium of claim 16, further comprising:
determining a current availability level of the storage system based on the second MTTNA;

determining whether the current availability level deviates from the minimum availability level by more than a threshold amount; and responsive to determining that the current availability level deviates from the minimum availability level by more than the threshold amount, determining the second erasure coding configuration of the storage system based on the second MTTNA and the minimum availability level.

18. The non-transitory computer-readable storage medium of claim 10, wherein determining the second erasure coding configuration of the storage system based on the second failure rate and the one or more minimum reliability metrics includes:

applying a machine learning model to the collected data associated with failures of the storage device within the storage system, wherein the machine learning model is trained using historical data associated with storage devices, corresponding erasure coding configurations, and reliability metrics, to receive data associated with failures of a category of storage devices and specified one or more minimum reliability metrics as input to output an erasure coding configuration that can provide the specified one or more minimum reliability metrics using the storage devices of the category.

19. A computing system comprising:

one or more computer processors; and a non-transitory computer readable storage medium storing instructions that when executed by the one or more computer processors, cause the one or more computer processors to perform steps comprising computer-implemented method, comprising:

receiving a first failure rate of a storage device within a storage system based on manufacturer specification, the storage system associated with one or more minimum reliability metrics;

determining a first erasure coding configuration of the storage system based on the first failure rate and the one or more minimum reliability metrics of the storage system;

encoding data in the storage device based on the first erasure coding configuration;

collecting data associated with failures of the storage device within the storage system;

determining, based on the collected data associated with failures of the storage device, a second failure rate that deviates from the first failure rate by a predetermined threshold;

determining a second erasure coding configuration of the storage system, different from the first erasure coding configuration, based on the second failure rate and the one or more minimum reliability metrics;

re-encoding data in the storage device based on the second erasure coding configuration.

20. The computing system of claim 19, wherein the first erasure coding configuration of the storage system includes storing data in a first number of data chunks and a second number of parity chunks, and the second erasure coding configuration of the storage system is determined by modifying the first number of data chunks or the second number of parity chunks.

* * * * *